(12) United States Patent
Mori

(10) Patent No.: US 9,043,708 B2
(45) Date of Patent: May 26, 2015

(54) INFORMATION PROCESSING APPARATUS, INFORMATION PROCESSING SYSTEM, INFORMATION PROCESSING APPARATUS CONTROL METHOD, AND STORAGE MEDIUM

(75) Inventor: Ryuta Mori, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 515 days.

(21) Appl. No.: 13/151,961

(22) Filed: Jun. 2, 2011

(65) Prior Publication Data

US 2012/0005601 A1    Jan. 5, 2012

(30) Foreign Application Priority Data

Jun. 30, 2010   (JP) ................................. 2010-150257

(51) Int. Cl.
*G06F 3/048* (2013.01)
*H04N 1/00* (2006.01)
*G06F 17/30* (2006.01)
*H04N 1/32* (2006.01)

(52) U.S. Cl.
CPC ...... *H04N 1/00923* (2013.01); *G06F 17/30905* (2013.01); *H04N 1/00244* (2013.01); *H04N 1/00464* (2013.01); *H04N 1/32128* (2013.01); *H04N 2201/0094* (2013.01); *H04N 2201/3225* (2013.01); *H04N 2201/3278* (2013.01)

(58) Field of Classification Search
CPC .......... G06F 17/3089; G06F 17/30873; G06F 17/30905
USPC ........................ 715/760; 358/1.13, 1.14, 1.15
See application file for complete search history.

(56) References Cited

U.S. PATENT DOCUMENTS 5,832,301 A * 11/1998 Yamaguchi ..................... 710/48
7,814,406 B2   10/2010 Ozawa
(Continued)

FOREIGN PATENT DOCUMENTS

CN   1930883    3/2007
CN   101021859  8/2007
(Continued)

OTHER PUBLICATIONS

Korean Office Action issued Sep. 16, 2013, issued during prosecution of related Korean application No. 10-2011-0061460.

(Continued)

*Primary Examiner* — Anil Bhargava
(74) *Attorney, Agent, or Firm* — Fitzpatrick, Cella, Harper & Scinto

(57) ABSTRACT

An information processing apparatus according to this invention, being capable of communicating with a Web server via a network, receives from the Web server a response to a processing request issued to a Web application of the Web server. The information processing apparatus changes, when screen control information described in a header of the response contains information which designates priority of a screen display by a Web browser of the information processing apparatus, priority of the screen display by the Web browser to the designated priority. When an event to display a screen other than a screen by the Web browser occurs while the Web browser presents a screen display corresponding to the response, the information processing apparatus inhibits an interrupt display by the event in order for the designated priority.

8 Claims, 10 Drawing Sheets

(56) References Cited

U.S. PATENT DOCUMENTS

| | | | |
|---|---|---|---|
| 8,239,257 B2* | 8/2012 | Li | 705/14.1 |
| 2005/0132355 A1* | 6/2005 | Greenberg et al. | 717/174 |
| 2005/0228873 A1* | 10/2005 | Tapuska et al. | 709/219 |
| 2005/0240940 A1* | 10/2005 | Quinet et al. | 719/315 |
| 2006/0077423 A1 | 4/2006 | Mathieson et al. | |
| 2007/0192732 A1* | 8/2007 | Nitta et al. | 715/788 |
| 2008/0301577 A1* | 12/2008 | Onda et al. | 715/794 |
| 2009/0013034 A1* | 1/2009 | Cheng et al. | 709/203 |
| 2009/0150759 A1* | 6/2009 | Chung et al. | 715/200 |
| 2010/0110480 A1* | 5/2010 | Satake | 358/1.15 |
| 2010/0130224 A1* | 5/2010 | Ishizu et al. | 455/453 |
| 2010/0179873 A1* | 7/2010 | Li | 705/14.49 |
| 2011/0258280 A1* | 10/2011 | Sloan et al. | 709/207 |

FOREIGN PATENT DOCUMENTS

| | | |
|---|---|---|
| CN | 101599156 | 12/2009 |
| JP | 7-219727 | 8/1995 |
| JP | 9-146726 | 6/1997 |
| JP | 2004-78936 | 3/2004 |
| JP | 2005-301890 | 10/2005 |
| JP | 2006-127503 | 5/2006 |
| JP | 2007-180628 | 7/2007 |

OTHER PUBLICATIONS

Chinese Office Action dated Nov. 13, 2013 issued during prosecution of related Chinese application No. 201110182032.4. (Whole English-language translation included).

* cited by examiner

INFORMATION PROCESSING APPARATUS, INFORMATION PROCESSING SYSTEM, INFORMATION PROCESSING APPARATUS CONTROL METHOD, AND STORAGE MEDIUM

BACKGROUND OF THE INVENTION

1. Field of the Invention

The present invention relates to an information processing apparatus, information processing system, information processing apparatus control method, and storage medium.

2. Description of the Related Art

It is recently known that an information processing apparatus such as a PC is connected to a Web server on a network and the Web browser of the information processing apparatus displays, on a display unit, an operation screen based on screen information provided by the Web server. In this case, the Web browser of the information processing apparatus issues an operation screen acquiring request to the Web server by designating a URL. Upon receiving the acquiring request from the information processing apparatus, a Web application in the Web server generates HTML data for displaying the operation screen on the display unit by the Web browser, and transmits it to the information processing apparatus. In the information processing apparatus, the Web browser analyzes the received HTML data, and displays a screen based on the description of the received HTML data on the display unit. Further, when the information processing apparatus accepts information input by the user to the screen displayed by the Web browser, it can notify the Web server of the input information. Upon receiving the notification, the Web server causes the Web application to execute processing according to the input instruction, and transmits HTML data obtained by this processing to the information processing apparatus. At this time, the HTTP protocol is often used to communicate between the information processing apparatus and the Web server.

Some recent peripheral devices such as a Multi Function Peripheral (MFP) having a scanner and printer include the above-mentioned Web browser. In an MFP disclosed in Japanese Patent Laid-Open No. 2006-127503, the Web browser displays, on the display unit, an operation screen provided by the Web server using the above procedures, and can accept various instructions from the user via the operation screen. According to Japanese Patent Laid-Open No. 2006-127503, the Web server provides an operation screen for inputting an instruction to use each function of the MFP. More specifically, the user of the MFP inputs an instruction to the MFP via an operation screen displayed on the display unit by the Web browser. The Web browser of the MFP notifies the Web server of the input instruction. The notified Web server requests the MFP to execute various processes in accordance with the contents of the instruction input by the user. The requested MFP executes the requested processes. This obviates the necessity to hold all menu data in the MFP to operate it, and also allows menu data to be changed by changing the menu data only on the Web server.

The operation screen of the MFP is not limited to one by the Web browser, and the user can even execute an operation to an operation screen provided by the information processing apparatus itself for general copying, printing, FAX, and the like. For example, as described in Japanese Patent Laid-Open No. 2005-301890, an operation screen to be activated is determined based on a user operation for the operation screen of an application provided by the Web browser or information processing apparatus, and a screen to be finally displayed on the foreground is determined.

However, screen control using the conventional technique has the following problem. For example, if an error such as opening of the cover occurs in the MFP while the Web browser uses the Web application function of the Web server, an error notification screen appears on the foreground on the display unit of the MFP regardless of whether Web browser processing is in progress. The user cannot continue processing by the Web browser unless he takes a measure (pressing the "OK" button or closing the cover) notified by the error notification screen.

SUMMARY OF THE INVENTION

The present invention has been made to overcome the conventional drawbacks, and provides an information processing apparatus, information processing system, information processing apparatus control method, and storage medium for presenting, in order of priority designated by a Web application, a screen display pertaining to an interrupt display event generated while the Web browser displays the result of processing by the Web application on the display unit.

One aspect of the present invention provides an information processing apparatus capable of communicating with a Web server via a network, comprising: a reception unit that receives, from the Web server, a response to a processing request issued to a Web application of the Web server; an analysis unit that analyzes screen control information described in a header of the response received by the reception unit; a change unit that, when the screen control information contains information which designates priority of a screen display by a Web browser of the information processing apparatus, changes priority of the screen display by the Web browser to the designated priority; and a display control unit that, when an event to display a screen other than a screen by the Web browser occurs while the Web browser presents a screen display corresponding to the response, and when priority of a screen display by the event is lower than the priority of the screen display by the Web browser that has been changed by the change unit, inhibits an interrupt display by the event.

Another aspect of the present invention provides an information processing system comprising a Web server and an information processing apparatus capable of communicating with the Web server via a network, the Web server including: an execution unit that executes processing corresponding to a processing request from the information processing apparatus; an attaching unit that attaches, to a header of a response containing a result of the processing executed by the execution unit, screen control information for controlling a display screen of a Web browser of the information processing apparatus, the screen control information containing information which designates priority of a screen display by the Web browser; and a transmission unit that transmits, to the information processing apparatus, the response to which the attaching unit attaches the screen control information, and the information processing apparatus including: a reception unit that receives the response transmitted by the transmission unit; an analysis unit that analyzes the screen control information described in the header of the response received by the reception unit; a change unit that changes priority of the screen display by the Web browser in accordance with the information of the priority contained in the screen control information; and a display control unit that, when an event to display a screen other than a screen by the Web browser occurs while the Web browser presents a screen display corresponding to the response, and when priority of a screen display by the event is lower than the priority of the screen display by the Web browser that has been changed by the change unit, inhibits an interrupt display by the event.

Still another aspect of the present invention provides a method for controlling an information processing apparatus capable of communicating with a Web server via a network, comprising: causing a reception unit of the information processing apparatus to receive, from the Web server, a response to a processing request issued to a Web application of the Web server; causing an analysis unit of the information processing apparatus to analyze screen control information described in a header of the response received by the reception unit; causing a change unit of the information processing apparatus to, when the screen control information contains information which designates priority of a screen display by a Web browser of the information processing apparatus, change priority of the screen display by the Web browser to the designated priority; and causing a display control unit of the information processing apparatus to, when an event to display a screen other than a screen by the Web browser occurs while the Web browser presents a screen display corresponding to the response, and when priority of a screen display by the event is lower than the priority of the screen display by the Web browser that has been changed by the change unit, inhibit an interrupt display by the event.

Yet another aspect of the present invention provides a computer-readable storage medium which stores a program for causing a computer to function as an information processing apparatus capable of communicating with a Web server via a network, the program causing the computer to function as: a reception unit that receives, from the Web server, a response to a processing request issued to a Web application of the Web server, an analysis unit that analyzes screen control information described in a header of the response received by the reception unit, a change unit that, when the screen control information contains information which designates priority of a screen display by a Web browser of the information processing apparatus, changes priority of the screen display by the Web browser to the designated priority, and a display control unit that, when an event to display a screen other than a screen by the Web browser occurs while the Web browser presents a screen display corresponding to the response, and when priority of a screen display by the event is lower than the priority of the screen display by the Web browser that has been changed by the change unit, inhibits an interrupt display by the event.

According to the present invention, even when an interrupt display event occurs while the Web browser displays the result of processing by the Web application on the display unit, the result of processing by the Web application can be kept displayed.

Further features of the present invention will become apparent from the following description of exemplary embodiments (with reference to the attached drawings).

DESCRIPTION OF THE EMBODIMENTS

Embodiments of the present invention will be described in detail below with reference to the accompanying drawings. It should be understood that the following embodiments are not intended to limit the scope of the appended claims, and that not all combinations of features set forth in the embodiments are indispensable for the means of solution in the present invention.

<First Embodiment>

Figure 1:
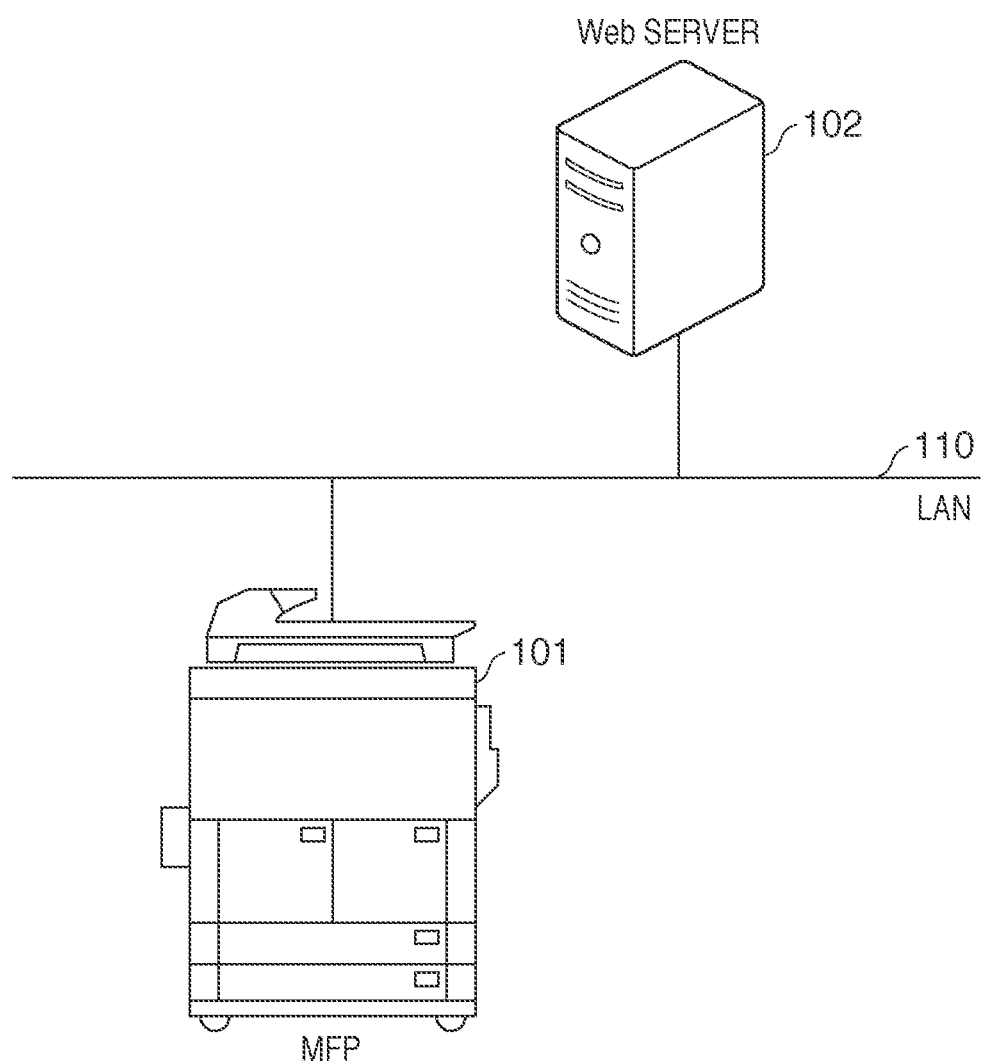
FIG. 1 is a view showing the overall configuration of an information processing system according to the first embodiment of the present invention.
Figure 2A:
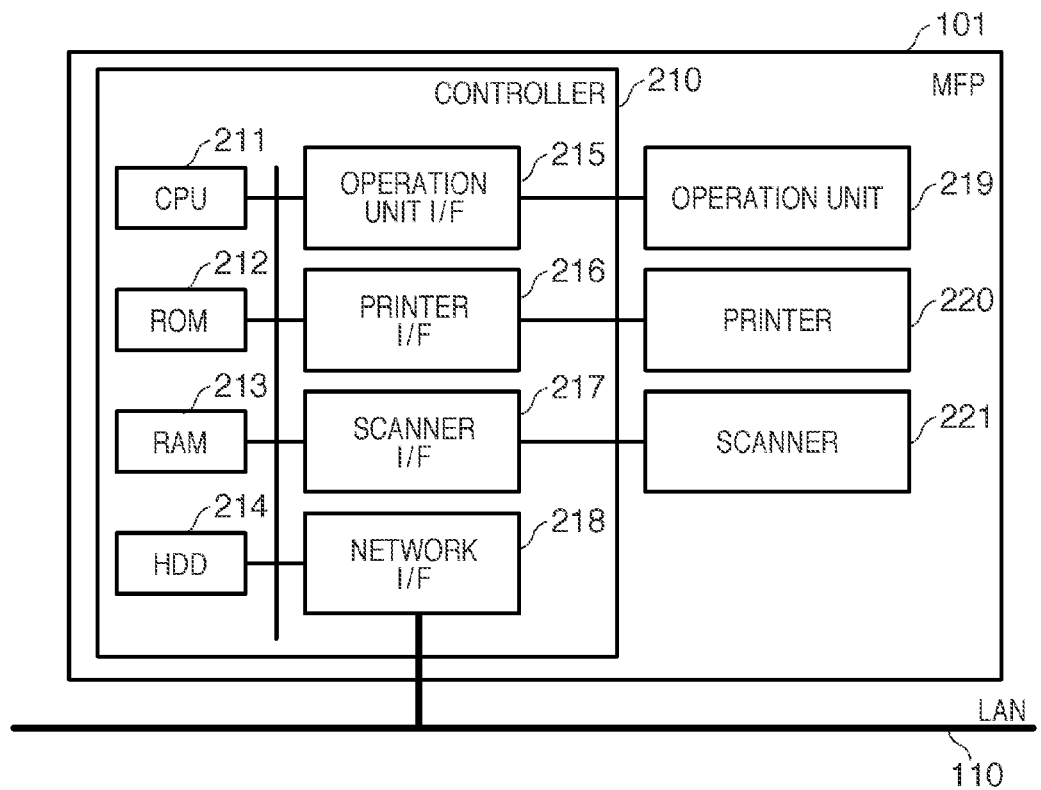
FIG. 2A is a block diagram showing the configuration of an MFP.
Figure 2B:
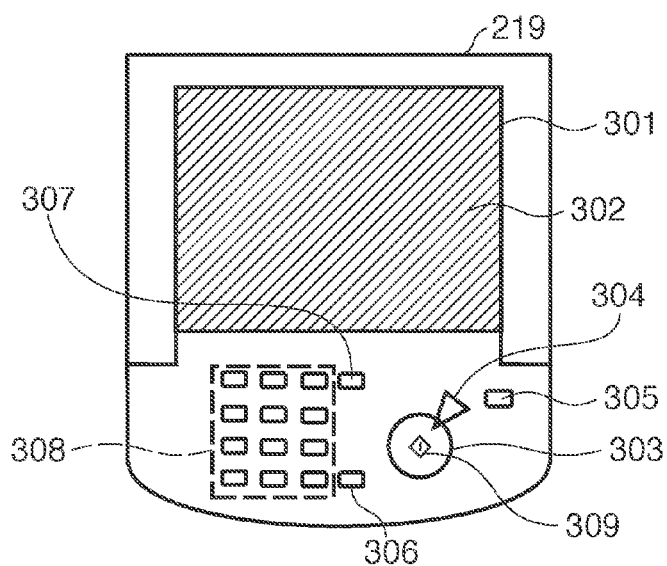
FIG. 2B is a view showing the outer appearance of an operation unit in the MFP.
Figure 3:
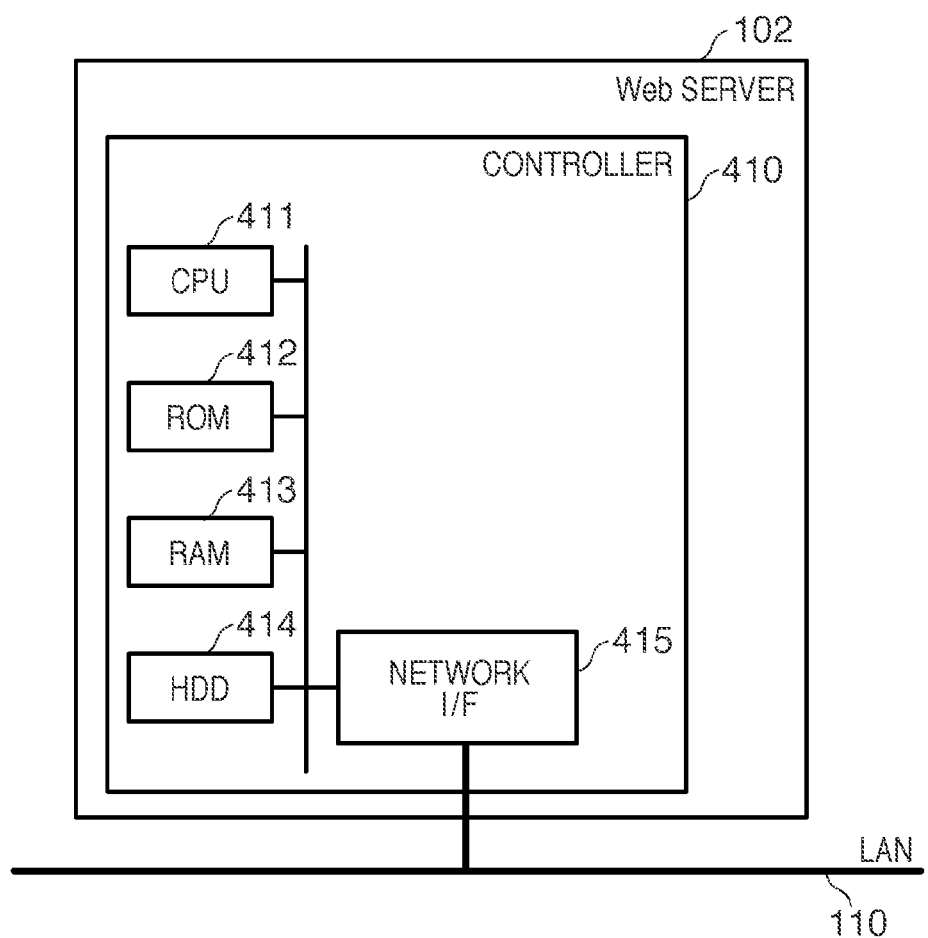
FIG. 3 is a block diagram showing the configuration of a Web server.

The hardware configuration of an information processing system according to the first embodiment will be described with reference to FIGS. 1 to 3. As shown in FIG. 1, the information processing system includes an MFP 101 and Web server 102. The MFP 101 and Web server 102 are connected to a network such as a LAN 110 and can communicate with each other.

[Configuration of MFP (FIGS. 2A & 2B)]

A controller 210 including a CPU 211 controls the whole operation of the MFP 101. The CPU 211 reads out control programs loaded from a ROM 212 or HDD 214 to a RAM 213, and executes various control processes such as reading control and transmission control. A RAM 213 is used as a temporary storage area such as a main memory or work area for the CPU 211. The HDD 214 stores image data, various programs, or various information tables (to be described later).

An operation unit I/F 215 connects an operation unit 219 and the controller 210. The operation unit 219 includes a liquid crystal display unit having a touch panel function, and a keyboard. The MFP 101 has a Web browser function (to be described later). The Web browser of the MFP 101 analyzes an HTML file received from the Web server 102, and displays an operation screen based on the description of the received HTML file on the operation unit 219 (that is, the liquid crystal display unit). Details of the operation unit 219 will be described later.

A printer I/F 216 connects a printer 220 and the controller 210. Image data to be printed by the printer 220 is transferred from the controller 210 to the printer 220 via the printer I/F 216, and printed on a printing medium by the printer 220.

A scanner I/F 217 connects a scanner 221 and the controller 210. The scanner 221 reads an image on a document to generate image data, and outputs the generated image data to the controller 210 via the scanner I/F 217.

A network I/F 218 connects the controller 210 of MFP 101 to the LAN 110. The network I/F 218 transmits image data and information to an external apparatus (for example, the Web server 102) on the LAN 110, or receives various kinds of information from the external apparatus on the LAN 110.

[Detailed Arrangement of Operation Unit 219 (FIG. 2B)]

The operation unit 219 includes an LCD display 301 obtained by adhering a touch panel sheet 302 onto an LCD. The LCD display 301 displays a native function module (to be described later), an operation screen by the Web browser, and soft keys. When the user presses a key or the like displayed on the LCD display 301, the operation unit 219 notifies the CPU 211 of position information indicating the position pressed on the touch panel sheet 302. The operation unit 219 includes various hard keys such as a start key 303, stop key 304, reset key 305, guide key 306, top menu key 307, and numeric key pad 308. The start key 303 is used to designate the start of a document image reading operation. A two-color LED display unit 309 of green and red is arranged at the center of the start key 303. The two-color LED display unit 309 indicates by its color whether the start key 303 is available. The stop key 304 is used to stop a running operation. The reset key 305 is used to initialize settings. The guide key 306 is used to display the usage of the MFP 101 on the LCD display 301. The top menu key 307 is used to display, on the LCD display 301, a top menu screen for selecting a function of the MFP 101. The numeric key pad 308 is used to input numeric values.

[Configuration of Web Server (FIG. 3)]

The Web server 102 includes a controller 410 which controls the whole operation of the Web server 102. A CPU 411 reads out control programs loaded from a ROM 412 or HDD 414 to a RAM 413, and executes various control processes. The RAM 413 is used as a temporary storage area such as a main memory or work area for the CPU 411. The HDD 414 stores image data, various programs, or various information tables. A network I/F 415 connects the controller 410 of the Web server 102 to the LAN 110. The network I/F 415 transmits/receives various kinds of information to/from another apparatus on the LAN 110.

[Software Configuration of Information Processing System (FIG. 4)]

Figure 4:
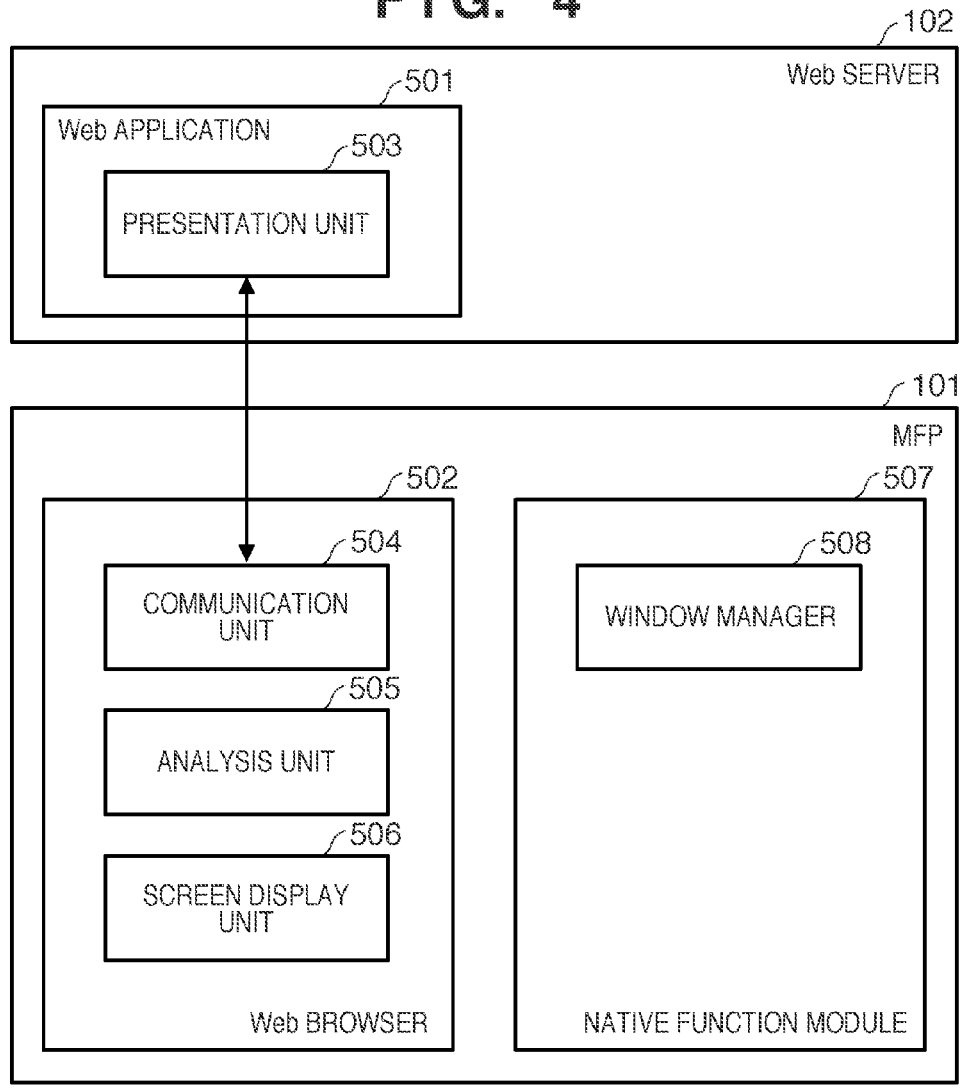
FIG. 4 is a block diagram showing the software configuration of an information processing apparatus.

Functional units shown in FIG. 4 are implemented by executing control programs by the CPU 211 of the MFP 101 and the CPU 411 of the Web server 102. The MFP 101 includes a native function module 507 and Web browser 502. The native function module 507 includes various native applications not provided from the Web server 102 but provided as programs held in the MFP 101. The native function module 507 includes, for example, an application which executes print processing by the printer 220 of the MFP 101, reading processing by the scanner 221, or transmission processing via the network I/F 218. The native function module 507 also includes, for example, a module which performs setting of the overall MFP 101 or application switching processing.

The Web browser 502 includes a communication unit 504, analysis unit 505, and screen display unit 506. The communication unit 504 communicates with a presentation unit 503 included in a Web application 501 of the Web server 102 in accordance with the HTTP protocol. More specifically, the communication unit 504 requests, of the Web application 501, an operation screen to be displayed on the operation unit 219 by the Web browser 502. Also, the communication unit 504 notifies the Web application 501 of an instruction input by the user via an operation screen displayed by the Web browser 502.

The analysis unit 505 analyzes an HTML file received as a response from the Web application 501. The HTML file contains a description indicating the contents of an operation screen to be displayed on the operation unit 219 by the Web browser 502. The received response also contains screen control information (to be described later).

The screen display unit 506 displays an operation screen on the operation unit 219 based on the result of analysis by the analysis unit 505. A screen displayed on the operation unit 219 based on information (for example, HTML file) received from the Web server 102 will be called a "Web browser screen". The native function module 507 includes a window manager 508. The window manager 508 controls the priority of a screen to be displayed on the operation unit 219 based on an instruction from the analysis unit 505, and displays the screen on the operation unit 219 in order of the priority.

The Web server 102 includes the Web application 501. The Web application 501 includes the presentation unit 503. The presentation unit 503 communicates with the communication unit 504. Upon receiving a request from the MFP 101, the presentation unit 503 transmits, to the MFP 101 as a response to the request, information of an operation screen to be displayed on the operation unit 219 by the Web browser 502 of the MFP 101. The presentation unit 503 receives, from the MFP 101, an instruction input by the user via an operation screen displayed by the Web browser 502 of the MFP 101.

Figure 5:
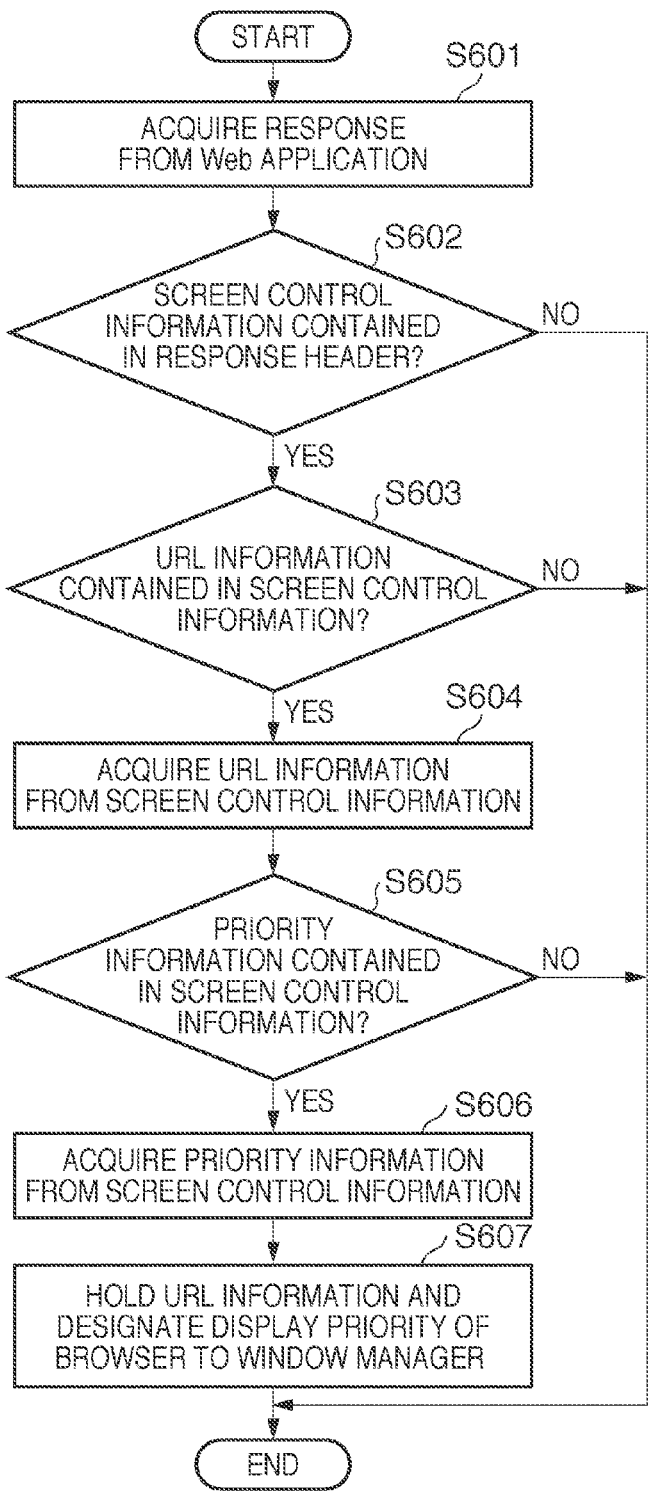
FIG. 5 is a flowchart showing the processing sequence of response analysis processing.
Figure 6:
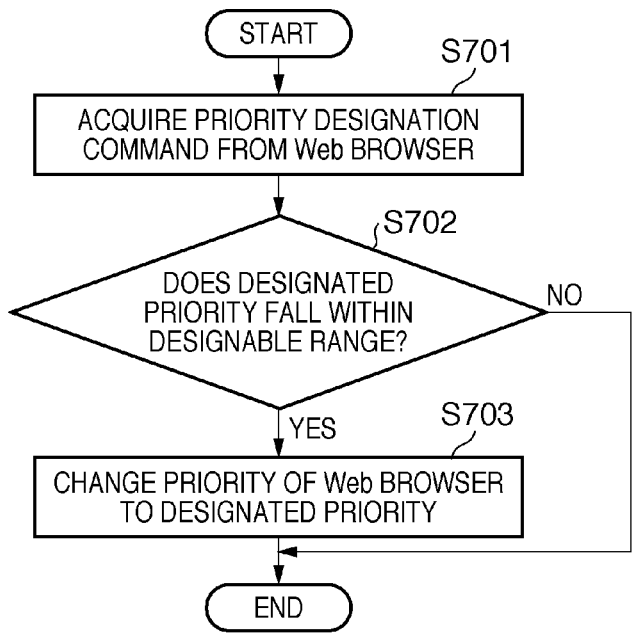
FIG. 6 is a flowchart showing the processing sequence of a window manager.
Figure 7:
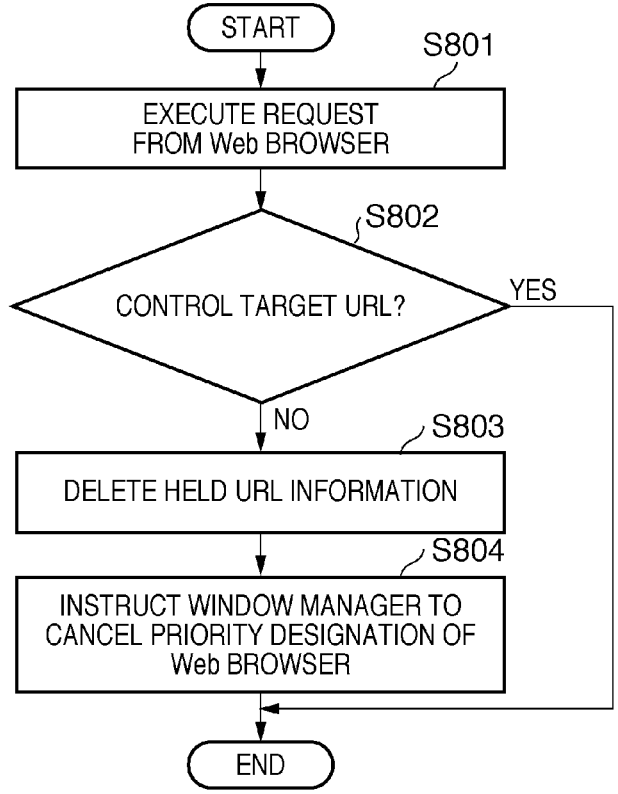
FIG. 7 is a flowchart showing the processing sequence of screen control cancel processing.

As a processing sequence in the information processing system, screen control when an error occurs in the MFP 101 during execution of the Web application 501 will be described with reference to FIGS. 5 to 7. Processes shown in FIGS. 5 to 7, 9, and 10 are implemented, in the MFP 101, by the CPU 211 loading a program stored in the ROM 212 or HDD 214 to the RAM 213 and executing it.

[Response Analysis Processing (FIG. 5)]

First, a processing sequence when the MFP 101 issues a request (processing request) to the Web server 102, the communication unit 504 acquires a response from the Web server 102, and the analysis unit 505 processes it will be explained.

When the Web browser 502 of the MFP 101 executes a request to the Web application 501 of the Web server 102, screen information (display data) such as an HTML file is sent as a response. At this time, the Web application 501 may transmit screen control information (see FIG. 8: to be described later) together with screen information.

The analysis unit 505 of the Web browser 502 acquires a response from the Web application 501 (step S601), and determines whether screen control information is contained (attached) in a header part 1001 (in FIG. 8) of the response (step S602). If no screen control information is contained, a series of processes ends. If screen control information is contained, the analysis unit 505 determines whether the screen control information contains URL information (storage address) corresponding to the storage location of screen information of a screen serving as a control target (step S603). If the screen control information does not contain URL information, a series of processes ends. If the screen control information contains URL information, the analysis unit 505 acquires the URL information from the screen control information (step S604).

Then, the analysis unit 505 determines whether the screen control information contains information (priority information) which designates the priority of a screen display by the Web browser 502 (step S605). If the screen control information does not contain the priority information, the analysis unit 505 ends a series of processes. If the screen control information contains the priority information, the analysis unit 505 acquires the priority information from the screen control information (step S606). The analysis unit 505 holds the URL information acquired from the screen control information, and designates, to the window manager 508, the display priority of the Web browser 502 that corresponds to the priority information acquired from the screen control information (step S607).

In the embodiment, when inhibiting interruption of processing in the Web browser 502 caused by, for example, display of a device error screen while executing processing by the Web application 501 via a screen displayed by the Web browser 502, the display priority of the Web browser 502 is designated to the window manager 508. More specifically, the display priority is designated so that display of a Web browser screen by the Web browser 502 precedes display of a screen pertaining to another processing.

[Processing by Window Manager (FIG. 6)]

The window manager 508 acquires a display priority designation command pertaining to the screen display from the Web browser 502 (step S701), and determines whether the designated priority actually falls within a range designable as display priority (step S702). If the designated priority does not fall within the designable range, a series of processes ends. If the designated priority falls within the designable range, the window manager 508 changes the display priority of the Web browser 502 to one designated from the Web browser 502 (step S703).

In the embodiment, display control by the window manager 508 is performed as follows based on priority designation. For example, assume that the Web browser 502 designates "2" as priority designation for the screen display by the Web browser 502, as shown in FIG. 9B. In this case, even if an event (display event) to display a screen other than screen type 1 1201, which is lower in priority than the screen of the Web browser 502, occurs while the Web browser 502 presents the screen display, an interrupt display by the display event is inhibited. Hence, a Web browser screen 1202 is kept displayed on the foreground.

[Screen Control Cancel Processing (FIG. 7)]

When the Web browser 502 executes a request to the Web application 501 via a screen corresponding to a URL serving as a control target (step S801), the analysis unit 505 of the Web browser 502 determines whether a URL corresponding to the request is a control target URL (step S802). If the corresponding URL is a control target URL, a series of processes ends. If the corresponding URL is not a control target URL, the analysis unit 505 deletes the held URL information when acquiring a response from the Web application 501 (step S803), and instructs the window manager 508 to cancel the priority designation of the Web browser 502 (step S804). For example, when the control target URL is a URL corresponding to the storage location of the error screen by the Web application 501, and the analysis unit 505 detects that the Web application 501 has solved the error and has shifted to the next screen, the analysis unit 505 cancels the display priority instruction issued to the window manager 508. The window manager 508 acquires the priority designation cancel instruction from the Web browser 502 in step S804, and then returns the display priority of the Web browser 502 to default priority.

[Example of Response Data from Web Application (FIG. 8)]

Figure 8:
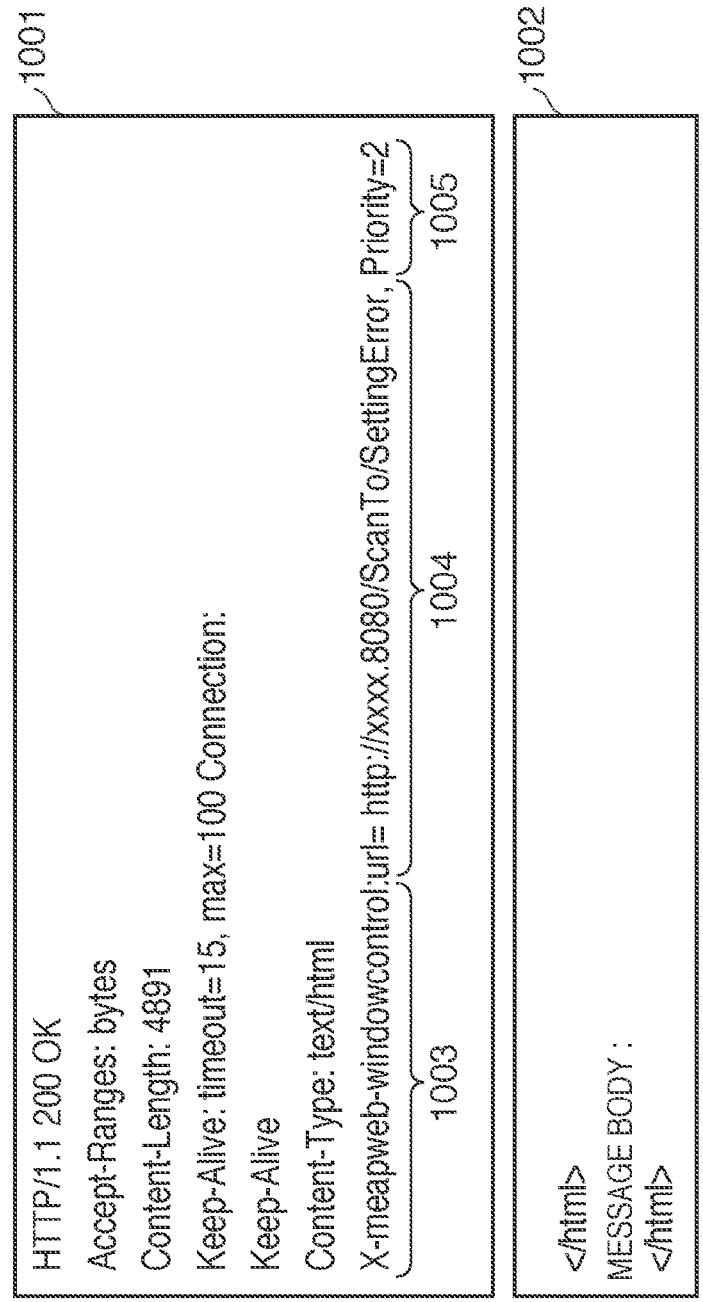
FIG. 8 is a view exemplifying response data from a Web application.

FIG. 8 shows response data acquired by the MFP 101 from the Web application 501 in step S601. The response data is formed from the header part 1001 and a body part 1002. The header part 1001 contains screen control information. The body part 1002 contains information necessary to display a screen such as HTML data. The screen control information contained in the header part 1001 contains a command name 1003, control target URL 1004, and screen priority designation information 1005.

[Example of Screen Priority Held in MFP (FIG. 9A)]

Figure 9A:
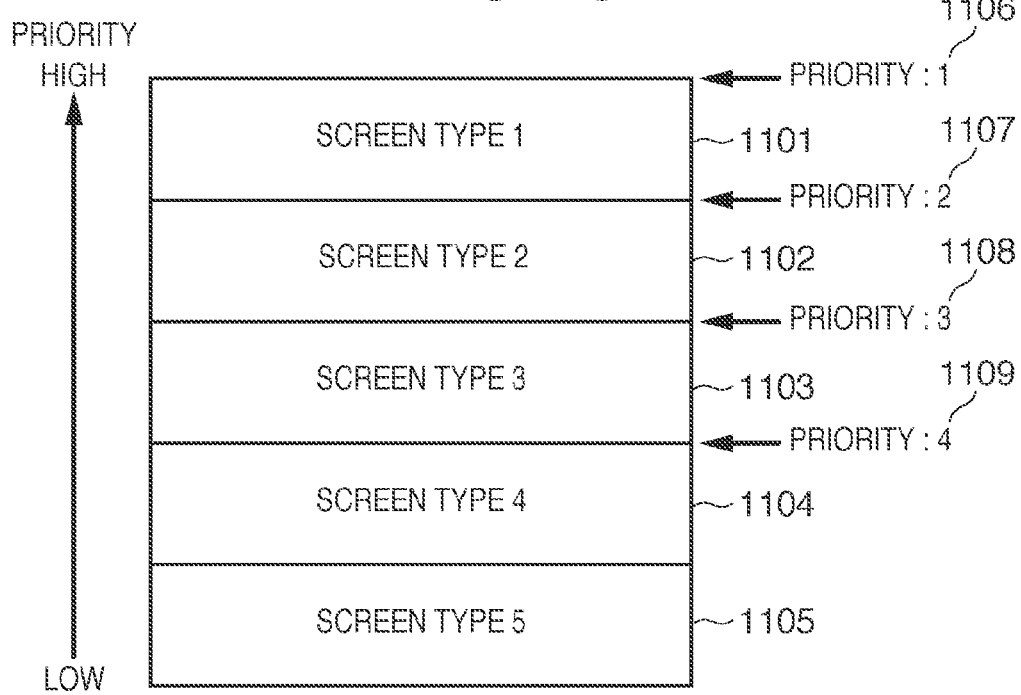
FIGS. 9A and 9B are views exemplifying screen priority held in the MFP, and priority designation to the window manager.
Figure 9B:
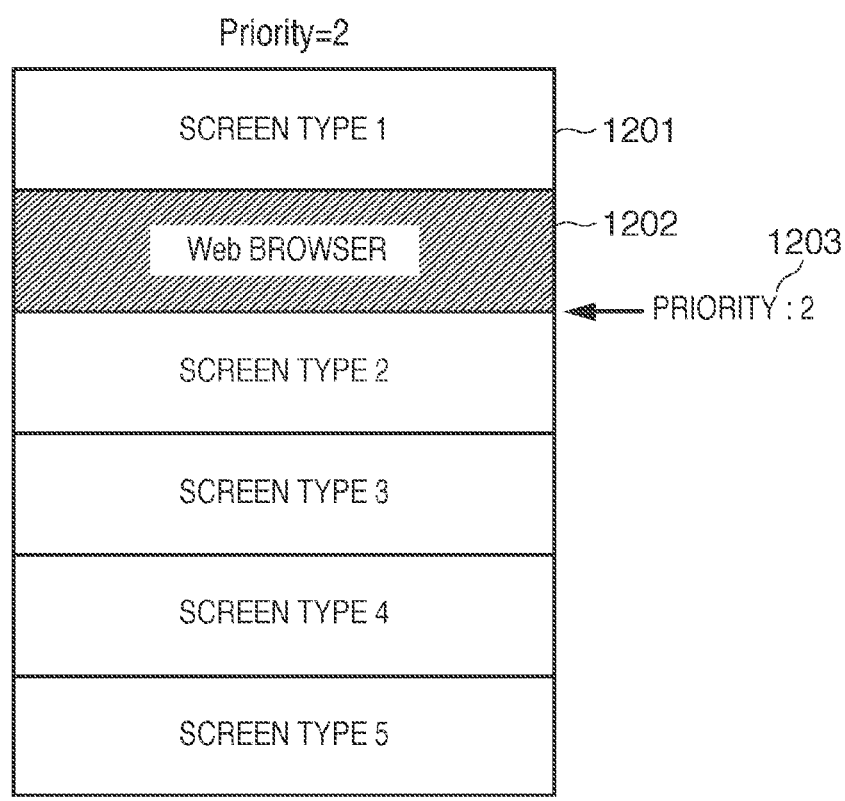
Figure 10:
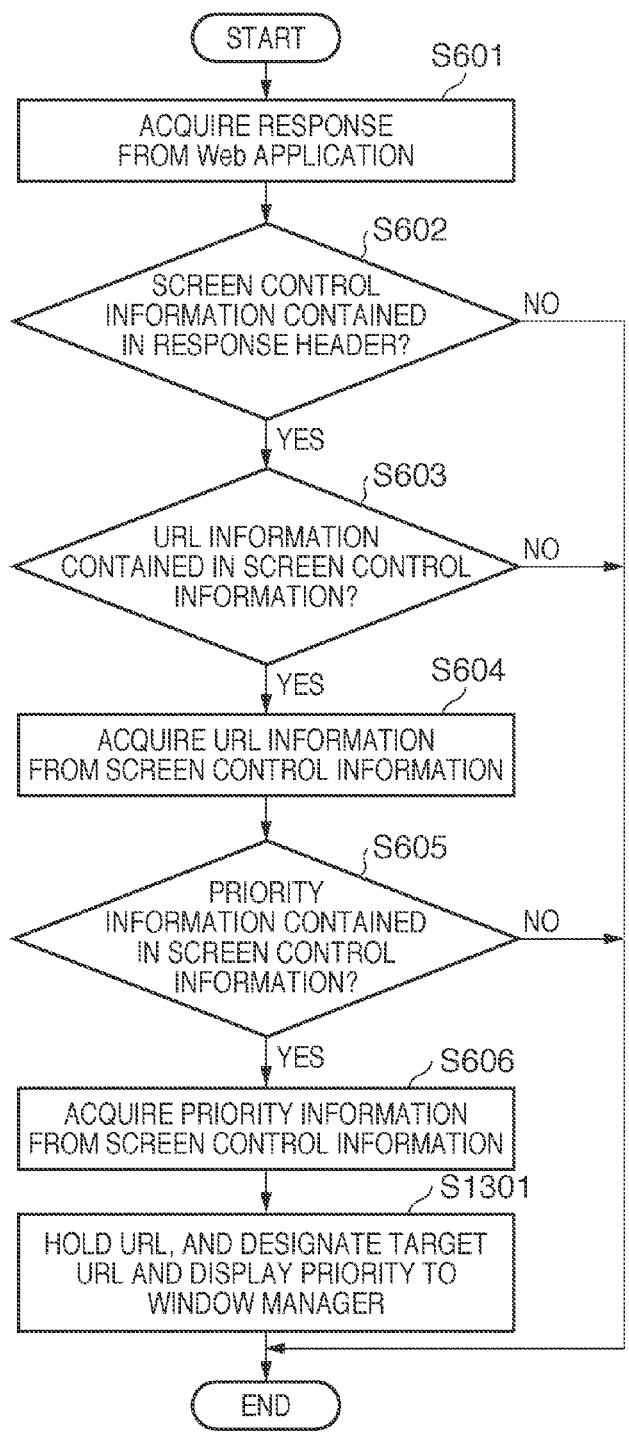
FIG. 10 is a flowchart showing the processing sequence of URL designation processing to a window manager according to the second embodiment of the present invention.

FIG. 9A shows screen display priority held in the window manager 508 of the MFP 101. The window manager 508 categorizes screen displays into types such as the status display screen of the MFP 101 and an application screen which are displayed on the operation unit 219. Screen types 1101 to 1105 correspond to screen categories. The window manager 508 sets priority to be displayed for each category. For example, some processes may be parallelly executed, and the timings to display screens for the respective processes may coincide with each other. In such a case, the window manager 508 performs screen display control by displaying a screen of high-priority screen type preferentially to one of low-priority screen type. The window manager 508 represents that the priority of screen type 1 is high and that of screen type 5 is low. The priority of an arbitrary screen can be changed by designating pairs of priority 1 (1106) to priority 4 (1109) and screens to be displayed to the window manager 508.

[Example of Priority Designation to Window Manager (FIG. 9B)]

Upon receiving screen control information from the Web application 501, the Web browser 502 designates priority (in this case, "2") designated in the screen control information to the window manager 508. In accordance with the instruction from the Web browser 502, the window manager 508 changes, to the designated priority, the display priority of a screen by the Web browser 502 that belongs to screen type 5. In this case, priority "2" is designated, so the priority of the Web browser screen becomes highest next to screen type 1. Therefore, while the Web browser 502 displays the result of processing by the Web application 501, even if the display of a screen pertaining to another processing in the MFP 101 is to overlap the display of the processing result, the Web browser screen is preferentially displayed except for a screen of screen type "1".

As described above, according to the first embodiment, a screen display pertaining to an interrupt display event generated while the Web browser 502 displays the result of processing by the Web application 501 is presented in order of priority designated by the Web application 501. As a result, the result of processing by the Web application 501 can be kept displayed.

(Second Embodiment)

Figure 11:
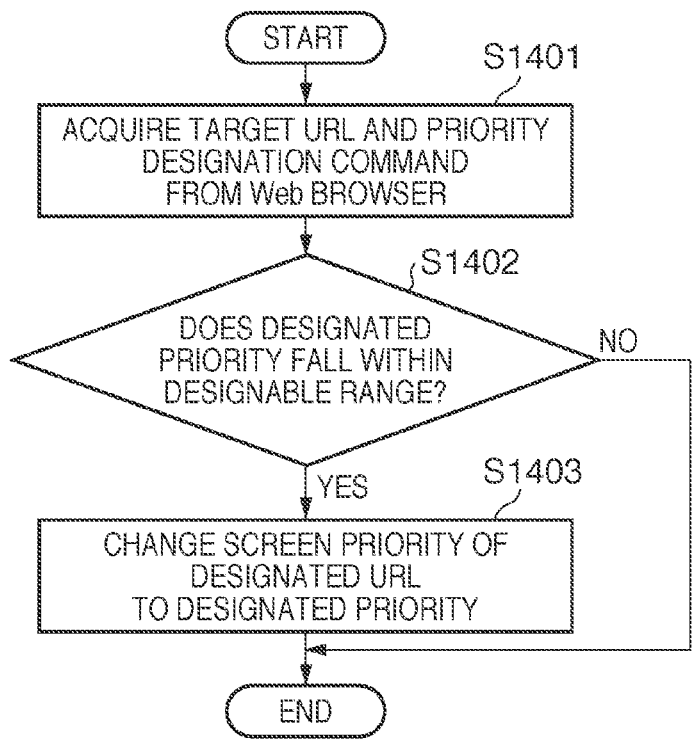
FIG. 11 is a flowchart showing the processing sequence of priority change processing in the window manager.
Figure 12:
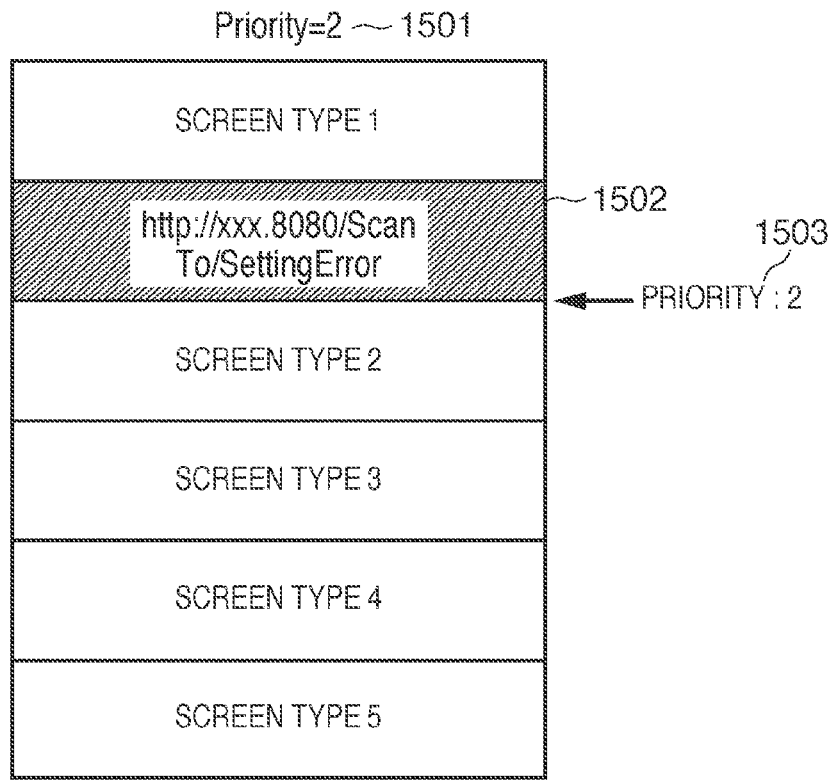
FIG. 12 is a view exemplifying priority designation to the window manager.

In the second embodiment, when a Web browser 502 designates priority to a window manager 508, priority can be designated for each screen to be displayed by the Web browser 502, instead of designating the priority of the Web browser itself. Processing sequences in an information processing system according to the second embodiment will be described with reference to FIGS. 10 to 12.

[Response Analysis Processing (FIG. 10)]

This processing is common to steps S601 to S606 of FIG. 5 except for step S1301. If an analysis unit 505 of the Web browser 502 determines in step S606 that priority has been designated, it holds a URL and designates the control target URL and display priority to the window manager 508 (step S1301).

[Processing by Window Manager (FIG. 11)]

The window manager 508 acquires a URL and priority designation command pertaining to the screen display from the Web browser 502 (step S1401), and determines whether the priority designated by the command actually falls within a range designable as display priority (step S1402). If the designated priority does not fall within the designable range, a series of processes ends. If the designated priority falls within the designable range, the window manager 508 changes, to the designated priority, the display priority of the screen of the designated URL out of screens of the Web browser 502 (step S1403).

[Example of URL and Priority Designation to Window Manager (FIG. 12)]

Upon receiving screen control information from a Web application 501, the Web browser 502 designates a designated URL ("http://xxxx.8080/ScanTo/SettingError") and priority ("2") to the window manager 508. In accordance with the instruction from the Web browser 502, the window manager 508 changes, to the designated priority, the display priority of the screen of the designated URL on the Web browser 502 that has belonged to screen type 5. In this example, priority "2" is designated, so the display priority becomes highest next to screen type 1. While the Web browser 502 displays the result of processing by the Web application 501 for the designated URL ("http://xxxx.8080/ScanTo/SettingError"), even if the display of a screen pertaining to another processing in an MFP 101 is to overlap the display of the processing result, the screen of the designated URL of the Web browser 502 is preferentially displayed except for a screen of screen type "1".

As described above, the second embodiment implements detailed screen control for each individual screen (URL) to be displayed by the Web browser 502, instead of controlling the priority of the overall Web browser with respect to the window manager 508. For example, when the Web browser 502 is a tab browser or the like, it is controlled for each tab whether to execute priority-based screen control. When a plurality of applications are processed using a plurality of tabs of the Web browser 502, it can be controlled for each application whether to execute priority-based screen control. The second embodiment can improve user friendliness more than by the first embodiment.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-150257, filed Jun. 30, 2010, which is hereby incorporated by reference herein in its entirety.

What is claimed is:

1. An information processing apparatus having a Web browser and being capable of communicating with a Web server via a network, comprising:
    a requesting unit that transmits, to the Web server, a request for a screen to be displayed by the Web browser;
    a reception unit that receives, from the Web server, a response to the request transmitted by the requesting unit, the response including priority information together with screen information;
    an obtaining unit that obtains the priority information included in the response received by the reception unit;
    a designating unit that designates display priority of the Web browser in accordance with the priority information obtained by the obtaining unit, the display priority indicating whether or not to display, with priority over a first screen which is to be displayed by an application other than the Web browser, a second screen which corresponds to the screen information included in the response received by the reception unit and is to be displayed by the Web browser; and
    a display control unit that, when an event to display the first screen occurs while the Web browser displays the second screen, controls whether or not to display the first screen with priority over the second screen, based on the display priority designated by the designating unit,
    wherein at least one of the requesting unit, reception unit, obtaining unit, designating unit and display control unit is implemented by a processor executing computer executable code stored in a memory.

2. The information processing apparatus according to claim 1, wherein the designating unit changes a display priority that has been assigned to the Web browser based on the priority information obtained by the obtaining unit,
    wherein the display control unit performs the control, based on the priority changed by the designating unit.

3. The information processing apparatus according to claim 2, further comprising a determination unit that determines whether or not to allow to change the display priority assigned to the Web browser.

4. The information processing apparatus according to claim 3, wherein the determination unit determines to allow to change the display priority assigned to the Web browser in a case where a display priority indicated by the priority information obtained by the obtaining unit is within a predetermined range.

5. The information processing apparatus according to claim 1, further comprising,
    a reading unit that reads an image from an original document and generates image data; and
    a printing unit that prints image data on a printing medium.

6. An information processing system comprising a Web server and an information processing apparatus having a Web browser and being capable of communicating with the Web server via a network,
    the Web server comprising:
    a first reception unit that receives a request for a screen to be displayed by the Web browser from the information processing apparatus; and
    a transmission unit that transmits, in response to the request received by the first reception unit, a response including priority information together with screen information, and
    the information processing apparatus comprising:
    a requesting unit that transmits, to the Web server, the request for the screen to be displayed by the Web browser;
    a second reception unit that receives the response transmitted by the transmission unit of the Web server;
    an obtaining unit that obtains the priority information included in the response received by the second reception unit;
    a designating unit that designates display priority of the Web browser in accordance with the priority information obtained by the obtaining unit, the display priority indicating whether or not to display, with priority over a first screen which is to be displayed by an application other than the Web browser, a second screen which corresponds to the screen information included in the response received by the second reception unit and is to be displayed by the Web browser; and a display control unit that, when an event to display the first screen occurs while the Web browser displays the second screen, controls whether or not to display the first screen with priority over the second screen, based on the display priority designated by the designating unit, wherein at least one of the first reception unit, transmission unit, requesting unit, second reception unit, obtaining unit, designating unit and display control unit is implemented by a processor executing computer executable code stored in a memory.

7. A method for controlling an information processing apparatus having a Web browser and being capable of communicating with a Web server via a network, the method executed by the information processing apparatus comprising:

transmitting, to the Web server, a request for a screen to be displayed by the Web browser;

receiving, from the Web server, a response to the request transmitted from the information processing apparatus, the response including priority information together with screen information;

obtaining the priority information included in the received response; and designating display priority of the Web browser in accordance with the obtained priority information, the display priority indicating whether or not to display, with priority over a first screen which is to be displayed by an application other than the Web browser, a second screen which corresponds to the screen information included in the received response and is to be displayed by the Web browser; and controlling, when an event to display the first screen occurs while the Web browser displays the second screen, whether or not to display the first screen with priority over the second screen, based on the designated display priority.

8. A non-transitory computer-readable storage medium which stores a program for causing a computer to function as an information processing apparatus having a Web browser and being capable of communicating with a Web server via a network, the program causing the computer to function as:

a requesting unit that transmits, to the Web server, a request for a screen to be displayed by the Web browser;

a reception unit that receives, from the Web server, a response to the request transmitted by the requesting unit, the response including priority information together with screen information, an obtaining unit that obtains the priority information included in the response received by the reception unit;

a designating unit that designates display priority of the Web browser in accordance with the priority information obtained by the obtaining unit, the display priority indicating whether or not to display, with priority over a first screen which is to be displayed by an application other than the Web browser, a second screen which corresponds to the screen information included in the response received by the reception unit and is to be displayed by the Web browser; and a display control unit that, when an event to display the first screen occurs while the Web browser displays the second screen, controls whether or not to display the first screen with priority over the second screen, based on the display priority designated by the designating unit.

* * * * *